A. ST. ONGE.
COTTON PICKER MACHINE.
APPLICATION FILED NOV. 9, 1911.
1,073,785.
Patented Sept. 23, 1913.
2 SHEETS—SHEET 2.
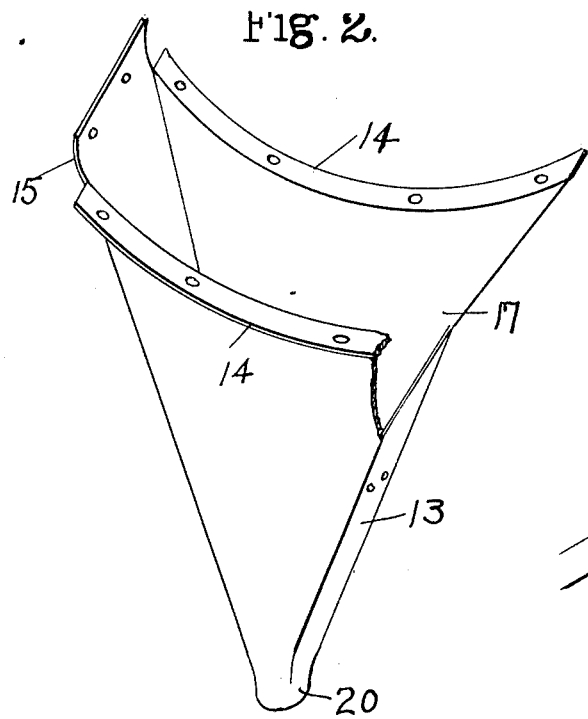
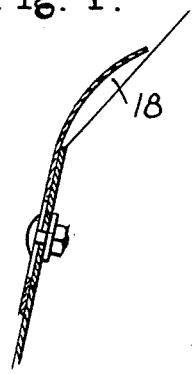
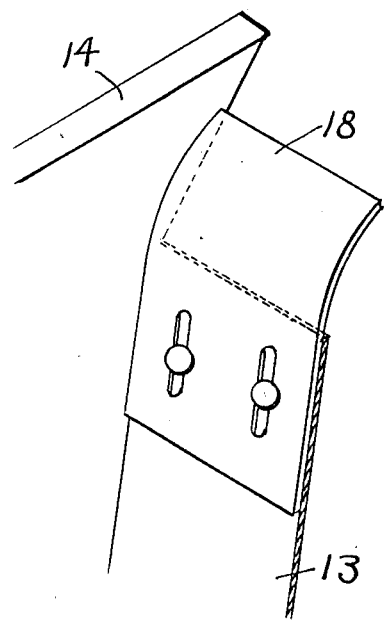
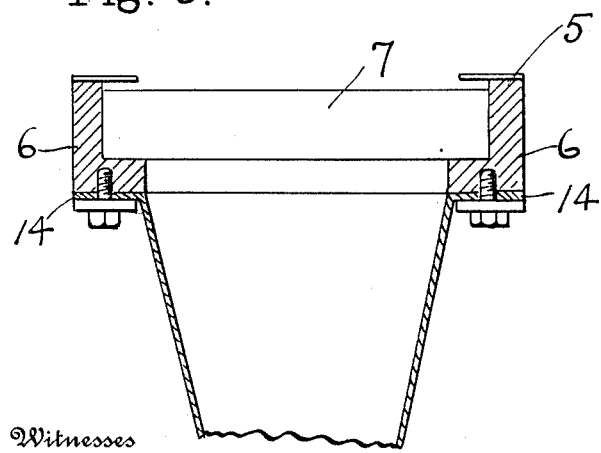
Witnesses
E. J. Ogden
Herbert L. Kelley
Inventor
Amasa St Onge
By Howard E. Barlow
Attorney

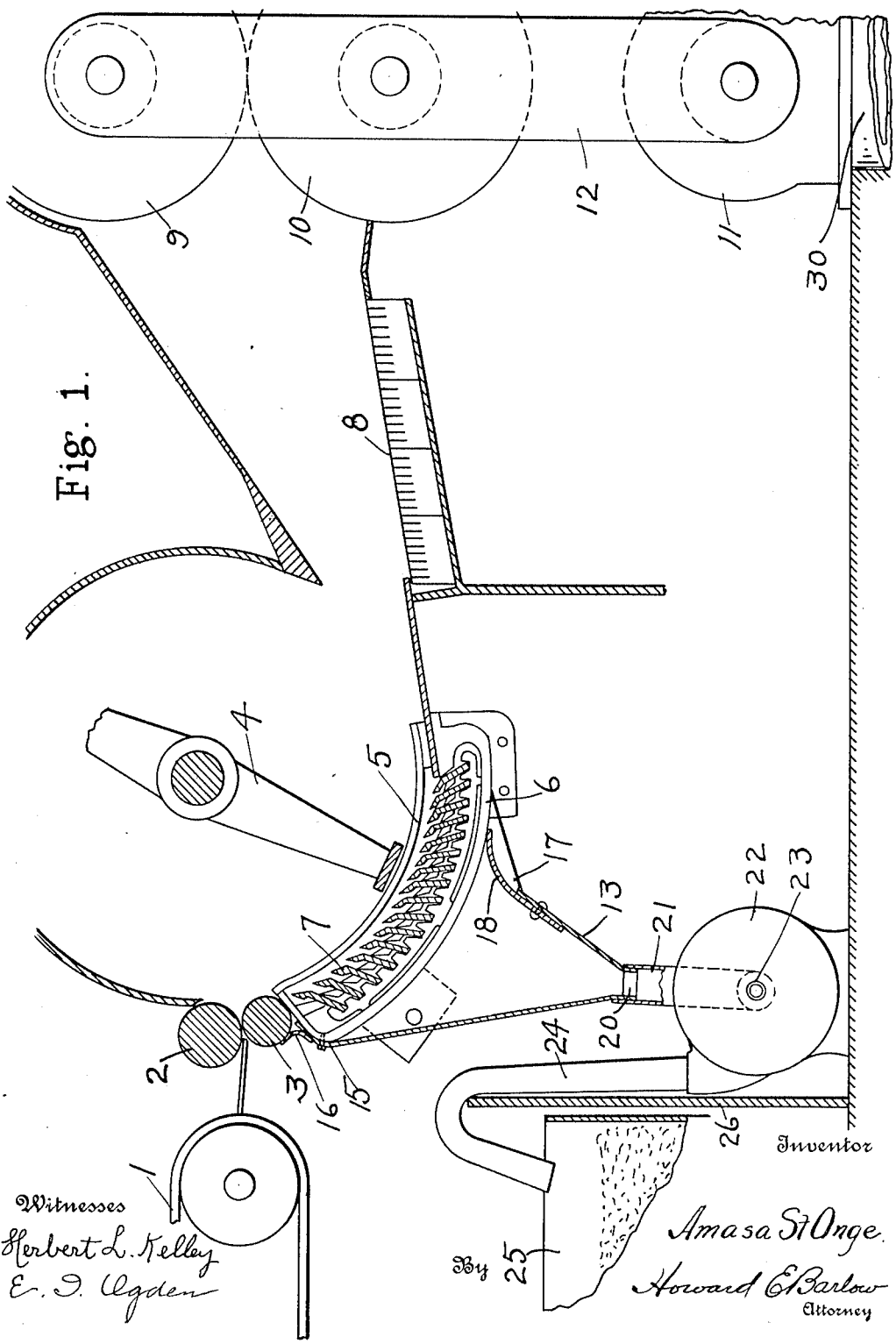

UNITED STATES PATENT OFFICE.

AMASA ST. ONGE, OF PROVIDENCE, RHODE ISLAND.

COTTON-PICKER MACHINE.

1,073,785. Specification of Letters Patent. Patented Sept. 23, 1913.

Application filed November 9, 1911. Serial No. 659,379.

*To all whom it may concern:*

Be it known that I, AMASA ST. ONGE, a citizen of the United States, and resident of the city of Providence, in the county of Providence and State of Rhode Island, have invented certain new and useful Improvements in Cotton-Picker Machines, of which the following is a specification.

This invention relates to cotton picker machines, and has for its object to provide simple, practical and effective means for creating a downward draft of air through the grid to assist in removing motes or other foreign matter from the cotton as it is passed over the grid bars.

A further object of the invention is to provide a blower for collecting and also removing or conveying away the foreign matter thus collected.

With these and other objects in view, the invention consists of certain novel features of construction, as will be more fully described and particularly pointed out in the appended claims.

Of the accompanying drawings: Figure 1— is a view showing a portion of a cotton picker machine with my improved device attached thereto. Fig. 2— is a perspective view showing a detail of my improved hood. Fig. 3— is a detail, partly in section, of the hood showing the flexible adjustable member by which any desired portion of the grid may be embraced by the hood. Fig. 4— is a detail showing the means of fastening this flexible member to the back portion of the hood. Fig. 5— is a central transverse section through the grid frame showing the means by which the hood is fastened to the grid frame.

In a cotton picker the material is fed by the apron 1 to the feed rolls 2 and 3, and is delivered to the beater 4 in the usual way. The grid 5, over which the rapidly rotating beater forces the cotton, is composed of two corresponding side frames 6—6 between which frames are mounted the usual grid bars 7, which may be adjusted and set in the usual manner to suit the conditions under which the machine is operated.

After the cotton has been acted upon by the beater it is drawn along over the second grid 8, by means of a suction of air caused by an exhaust blower 11 through the condenser rolls 9 and 10 and conduit 12, and deposited against the condenser rolls, which are covered with screen cloth, and formed into a lap.

In cotton pickers of the usual construction the suction or draft through the condenser rolls, creates a back draft throuh the grid, which in some cases serves to draw back a portion of the motes, and other foreign matter, even after it has passed through the grid as the cotton is being carried over the grid bars.

In my improved attachment I provide a hood 13, which is preferably constructed of sheet metal, the upper portion being provided with side flanges 14, through which to bolt it to the grid frame 6, while the front of the hood is provided with an upwardly extending lip 15 to cover the upper portion of the grid frame. A narrow strip 16 of leather, or other suitable flexible material is secured across the front portion of the hood to close the space between the feed roll 3 and the upper edge of the hood. The upper edge of the rear wall of this hood is preferably cut away as at 17 and the same is provided with a yieldable or bendable member 18 which is adapted to slide on this rear wall and have its upper edge engage the grid frame so as to regulate the length of this rear wall and cause the same to be extended sufficiently to take in or embrace the whole of the grid if desired, or to be slid downward or contracted to restrict the same to embrace only the desired portion of the grid. In other words, this slidable member may be regulated to include just the number of grid bars desired so that the action of the downward draft therethrough working in combination with the beater will determine the number of bars that are actually operating, and further by uncovering a number of the grid bars this adjustable member permits the air to be drawn upward therethrough by the cage roll draft to enter the passageway at a point back of where the cotton is deposited by the beater, thereby assisting the cotton to move from this point more quickly toward the cage rolls. It will therefore be seen that the cotton in passing over the bars covered by the hood causes the cotton to be drawn down so as to be dragged over their edges to better remove the large motes or foreign matter therefrom, while the number of bars not covered by this hood are left open to the action of a reverse draft which lifts the cotton from contact with these bars. The lower portion of this hood is constructed as at 20 so that the pipe 21 may be connected thereto and lead to an exhaust blower 22, which blower may be driven through the shaft 23 from any source of power, not shown. This blower is adapted to draw the foreign matter through and receive the same from the grid and conduct and deposit the same at any desired distance from the machine, but I have shown the blower in this particular instance as being provided with a discharge or conducting pipe 24 through which the material is deposited into the mote box 25 on the other side of the partition 26. When this box is filled it may be removed and another positioned to receive the waste therefrom.

The theory of the working of the ordinary cotton picker is that when the cotton is passed over the grid bars by the beaters the foreign matter passes through the grid and drops by gravity to the floor directly beneath, which theory would work very well if the space below were kept always empty, but this is not practical and as the pile grows larger and the space is reduced the back draft through the grid bars, created by the cage blower, naturally becomes stronger and prevents the motes and other foreign matter from falling through the bars, and it is carried on with the cotton into the lap. By the use of my improved device this difficulty is completely obviated, as the draft from the blower 22 completely neutralizes the draft from the cage blower 11 at the grid so that the foreign matter loosened by the beaters is drawn from the cotton through the grid, rendering the cleaning process at this point absolutely uniform at all times. Then again, by the old method the intensity of the draft through the condenser rolls was necessarily limited, owing to its effect upon the foreign matter at the grid, but by my improved construction the draft through these rolls may be greatly increased and made as heavy as desired, without in the least affecting the depositing of the foreign matter at this point.

In many instances a heavy draft through the condenser rolls is of great advantage, among others being first, the cotton is more evenly spread on the condenser rolls making a more even and perfect lap; second, the heavier the draft the greater portion of the loose particles of the dirt and dust which remain on the surface of the lap is drawn through the covering of wire screen into the center and conveyed away through the conductor 12 and blower 11 to some distant point or suitable receptacle through conductor pipe 30.

Another and great advantage in having a very strong draft through the condenser rolls is that all of the dust and dirt from the beaters 4 would be at once drawn through these cage rolls and disposed of, whereas now with machines having a weak draft this dust is forced by the beaters out through the cracks or crevices in the machine into the room, necessitating other blowers or devices for removing it therefrom to keep the room free. The primary advantage however, of my invention is that a much greater percentage of motes or other foreign matter is removed from the cotton as it passes over the grid bars due to the draft of the exhaust or suction blower 22 by which it is removed and deposited into the mote box 25 some distance away where it cannot again be drawn back into the lap.

I claim:

1. In a cotton picker, the combination with feed rolls, a set of grid bars and a beater, of a substantially air-tight hood engaging the underside of said grid bars, means for creating a downward draft through the grid and hood to assist gravity in removing the foreign matter separated from the cotton and forced through the grid by the beater, condenser rolls, and means for creating a suction through said condenser rolls, said hood being provided with means for regulating the area of said grid covered thereby.

2. In a cotton picker the combination with a set of grid bars, a beater, of a substantially air-tight hood secured to the underside of said grid bars, a blower for creating a downward draft through the grid and hood to assist gravity in removing the foreign matter separated from the cotton and forced through the grid by the beater, said blower being provided with a discharge pipe, condenser rolls, and means for creating a suction through said condenser rolls, said hood being provided with an adjustable wall to regulate the area of the grid covered thereby.

3. In a cotton picker, the combination with grid bars mounted in a frame, a beater, an air-tight hood secured to the underside of said grid frame, a blower for creating an exhaust draft downward through the grid and hood, condenser rolls, means for creating a suction through said condenser rolls, and an adjustable member carried by said hood to regulate the portion of said grid covered thereby.

4. In a cotton picker, the combination with grid irons mounted in a frame, a beater, an air-tight hood secured to the underside of said grid frame, a blower for creating an exhaust draft downward through the grid and hood, condenser rolls, means for creating a suction through said condenser rolls, and a slidably mounted wall carried by said hood to regulate the area of said grid covered thereby.

In testimony whereof I affix my signature in presence of two witnesses.

AMASA ST. ONGE.

Witnesses:
HOWARD E. BARLOW,
E. I. OGDEN.

Copies of this patent may be obtained for five cents each, by addressing the " Commissioner of Patents, Washington, D. C."